(12) United States Patent
Utermoehlen et al.

(10) Patent No.: US 11,137,267 B2
(45) Date of Patent: Oct. 5, 2021

(54) ROTATIONAL ANGLE SENSOR

(71) Applicant: Robert Bosch GmbH, Stuttgart (DE)

(72) Inventors: Fabian Utermoehlen, Leonberg (DE); Andreas Merz, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/066,514

(22) PCT Filed: Feb. 24, 2017

(86) PCT No.: PCT/EP2017/054279
§ 371 (c)(1),
(2) Date: Jun. 27, 2018

(87) PCT Pub. No.: WO2017/144638
PCT Pub. Date: Aug. 31, 2017

(65) Prior Publication Data
US 2019/0017845 A1    Jan. 17, 2019

(30) Foreign Application Priority Data
Feb. 24, 2016  (DE) ............... 10 2016 202 877.4

(51) Int. Cl.
*G01D 5/20*    (2006.01)
(52) U.S. Cl.
CPC .................. *G01D 5/2053* (2013.01)
(58) Field of Classification Search
None
See application file for complete search history.

(56) References Cited

U.S. PATENT DOCUMENTS

| 7,221,154 | B2* | 5/2007 | Lee | ............ | G01D 5/202 |
| | | | | | 324/207.11 |
| 2006/0255794 | A1* | 11/2006 | Lee | .......... | G01D 5/2053 |
| | | | | | 324/207.17 |

(Continued)

FOREIGN PATENT DOCUMENTS

| CN | 101501454 A | 8/2009 |
| DE | 40 21 637 A1 | 1/1992 |

(Continued)

OTHER PUBLICATIONS

Theil Thomas; Inductive position transducer, e.g. for machine carriage—has ferromagnetic short circuit body so that magnetic flux produced by stimulation coil forms closed ring; Published Jan. 9, 1992; Mehnert Theil; DE 4021637 A1; (Year: 1992).*

(Continued)

*Primary Examiner* — Nasima Monsur
(74) *Attorney, Agent, or Firm* — Maginot, Moore & Beck LLP

(57) ABSTRACT

A rotational angle sensor includes a stator element and a rotor element. The stator element has a transmitting coil and at least two receiving coils that are arranged within the transmitting coil and on a circuit board. The rotor element is mounted for rotation with respect to the stator element about an axis of rotation. The rotor element is configured to inductively couple the transmitting coil to the at least two receiving coils in such a way that the inductive coupling is dependent on a rotational angle between the stator element and the rotor element and the transmitting coil induces at least two angle-dependent alternating voltages in the at least two receiving coils. The rotor element and the at least two receiving coils are configured in such a way that an alternating voltage, the amplitude of which is sinusoidally (Continued)

dependent on the rotational angle, is induced in the receiving coils.

11 Claims, 6 Drawing Sheets

(56) References Cited

U.S. PATENT DOCUMENTS

| | | | |
|---|---|---|---|
| 2013/0257417 | A1 | 10/2013 | Ely |
| 2013/0271122 | A1* | 10/2013 | Kino .................. G01B 7/30 324/207.25 |

FOREIGN PATENT DOCUMENTS

| | | |
|---|---|---|
| DE | 103 12 813 A1 | 10/2004 |
| DE | 11 2011 100 330 T5 | 1/2013 |
| DE | 10 2013 012 758 A1 | 2/2014 |
| EP | 0 845 659 A2 | 6/1998 |
| EP | 0 909 955 B1 | 9/2009 |
| FR | 3 023 611 A1 | 1/2016 |
| JP | 2007-532872 A | 11/2007 |
| JP | 2008-134249 A | 6/2008 |
| JP | 2015-059779 A | 3/2015 |

OTHER PUBLICATIONS

Simon-Didier et al. ; Assembly Comprising a Motor Vehicle Engine Comprising of Targets, and an Angular Position Sensor; Continental Automotive Francefrcontinental Automotive GMBHDE; FR 3023611 A1 . (Published Jan. 15, 2016). (Year: 2016).*

Theil Thomas; Inductive position transducer, e.g. for machine carriage—has ferromagnetic short circuit body so that magnetic flux produced by stimulation coil forms closed ring; Published Jan. 9, 1992; Mehnert Theil; DE 4021637 A1; Not in English; Pictures Included (Year: 1992).*

International Search Report corresponding to PCT Application No. PCT/EP2017/054279, dated May 4, 2017 (German and English language document) (5 pages).

* cited by examiner

ROTATIONAL ANGLE SENSOR

This application is a 35 U.S.C. § 371 National Stage Application of PCT/EP2017/054279, filed on Feb. 24, 2017, which claims the benefit of priority to Serial No. DE10 2016/202877.4, filed on Feb. 24, 2016 in Germany, the disclosures of which are incorporated herein by reference in their entirety.

BACKGROUND

The disclosure relates to a rotational angle sensor, with which for example a rotational angle between a shaft and a further component can be determined. The disclosure also relates to a stator element for such a rotational angle sensor.

To measure rotational angles, rotational angle sensors in which a magnet is rotated over a corresponding magnetic field sensor are known for example. The measurement of the magnetic field vector then allows the rotational angle to be deduced. Such sensors also react to external magnetic fields, which are caused for example by a current flowing through power cables arranged alongside, and can be very sensitive to interference.

Another type of rotational angle sensor uses an eddy current effect. In this case, for example, a metallic target is moved over sensor coils, which are supplied with an AC voltage and induce an eddy current in the target. This causes a reduction in the inductances of the sensor coils and allows the rotational angle to be deduced from the change in frequency. For example, the coils form part of an oscillating circuit, the resonant frequency of which shifts when there is a change in the inductance. However, this type of rotational angle sensor may have a high cross sensitivity to installation tolerances (especially tilting of the target). The frequency generated may also be disturbed by external electromagnetic fields (injection locking), since frequencies in the range of several tens of MHz are usually used.

EP0 909 955 B1 has a rotational angle sensor with planar conductor loops which are short-circuited on a target and interact with the alternating electromagnetic field of an excitation coil.

In this case, a signal which for example resembles a square-wave signal is generated in dependence on the rotational angle and has to be complexly converted into the rotational angle by an evaluation unit. The angular resolution may be restricted by the steep edges of such signals.

SUMMARY

Embodiments of the present disclosure can advantageously make it possible to provide a robust and inexpensive angular rotational sensor which takes up little construction space and with which the sensor signals generated can be easily evaluated.

Ideas relating to embodiments of the present disclosure may be regarded as based inter alia on the concepts and findings described below.

The disclosure relates to a rotational angle sensor which can be used in particular in an environment with strong magnetic interference fields. For example, the rotational angle sensor can be used in the engine compartment or in the vicinity of the engine compartment of a vehicle, for example for determining a position of a throttle valve, a rotor position of a BLDC motor, a position of a gas pedal or a position of a camshaft. The angular rotational sensor described below is inexpensive, requires a small construction space and is based on a simple measuring principle.

According to one embodiment of the disclosure, the rotational angle sensor comprises a stator element with a transmitting coil and at least two receiving coils arranged within the transmitting coil, which are arranged on a circuit board, and a rotor element, which is mounted rotatably about an axis of rotation with respect to the stator element and by way of which the transmitting coil is inductively coupled to the at least two receiving coils, so that the inductive coupling is dependent on a rotational angle between the stator element and the rotor element and the transmitting coil induces at least two angle-dependent alternating voltages in the at least two receiving coils.

The term "within the transmitting coil" should be understood here as meaning that, in a plane in which the transmitting coil is arranged, the receiving coils are arranged in the plane or in a projection onto this plane within the (outer) contour of the transmitting coil.

The stator element, which may also carry an evaluation unit, may for example be arranged opposite the end of a shaft on which the rotor element is fastened. The rotor element may carry one or more induction segments, which are moved along with the shaft, cover the receiving coils and as a result change the inductance of the receiving coils or the respective inductive coupling between the transmitting coil and the receiving coils. If the transmitting coil is energized with an alternating voltage, alternating voltages of an amplitude that depends on the respective inductive coupling are induced in the receiving coils. The evaluation unit can then calculate for example a rotational angle signal from these alternating voltages or their amplitudes, which the sensor emits as measurement signals. The rotational angle sensor can in this way be implemented inexpensively, since no expensive magnet is required.

According to one embodiment of the disclosure, the rotor element and the at least two receiving coils are formed in such a way that an alternating voltage of an amplitude that is sinusoidally dependent on the rotational angle is induced in the receiving coils. In other words, on account of the geometry of the receiving coils and the rotor element, the measurement signal provided by a receiving coil, i.e. the amplitude of the alternating voltage induced in the receiving coil, is sinusoidal, or a sine function which depends on the rotational angle.

It should be understood that a sinusoidal measurement signal may be a signal that deviates less than 5% or less than 1% from a pure sine function.

For example, on the stator element there may be arranged, for example offset with respect to one another by a certain angle in the circumferential direction, two or three receiving coils, which produce angularly offset measurement signals. With two or three receiving coils, sinusoidal signals as measurement signals can be evaluated particularly easily, since an inverse transformation is possible. This may be an arctangent transformation in the case of two receiving coils (i.e. a two-phase system) or a Clarke transformation in the case of three receiving coils (i.e. a three-phase system). With these inverse transformations, offsets that occur for example due to mechanical tolerances can also be calculated out of the measurement signals in an easy way.

It is also possible that on the stator element there are two redundant receiving coil systems (for example in this case comprising two or three receiving coils). In this case, the measurement signals of the respective receiving coil system are evaluated in the way mentioned above. As a result, if one system fails, determination of the rotational angle is still possible, which can increase the dependability in the case of critical systems.

According to one embodiment of the disclosure, the at least two receiving coils are made up of arcuate conductor tracks electrically connected to one another, so that each of the at least two receiving coils is made up of partial turns oriented oppositely with respect to a current flow, each of which is delimited in a radial direction by at least one, for example arcuate, conductor track curved to the left and at least one opposite, for example arcuate, conductor track curved to the right.

In other words, each of the receiving coils is made up in such a way that an imaginary straight line that extends from the axis of rotation and runs in the radial direction intersects an arcuate conductor track curved to the left and an arcuate conductor track curved to the right of the receiving coil if the straight line runs through the interior of the receiving coil. It is in this way achieved that the amplitude of the alternating voltage induced in the receiving coil or the measurement signal depends substantially as a sine function on the rotational angle.

A partial turn of a receiving coil may in this case be defined as part of the receiving coil which is surrounded by conductor tracks of the receiving coil that do not intersect one another. The orientation of a partial turn is determined by a flow of current through the receiving coil. Oppositely oriented partial turns have respectively opposing flows of current when a current flows through the receiving coil, i.e. the current flows through the partial turn clockwise or to the right in the case of a partial turn of a first orientation, the current flows through the partial turn counterclockwise or to the left in the case of a partial turn of a second, opposite orientation.

The transmitting coil and the receiving coils do not have to go completely around the axis of rotation, but may also be arranged in just one circle sector with respect to a circle around the axis of rotation. In this case, the acceptance angle of the receiving coils determines the measuring range. In this way, the stator element can also be made smaller than in the case of a rotational angle sensor that is intended to cover the full 360°.

According to one embodiment of the disclosure, the at least two receiving coils are arranged in a ring sector region within the transmitting coil, which is defined by an inner circle around the axis of rotation, an outer circle around the axis of rotation and two radial lines connecting the inner circle to the outer circle, which are spaced apart from one another over a measuring range of the rotational angle sensor. The transmitting coil may surround the ring sector region and also be shaped substantially like the circumference of a (somewhat larger) sector of a ring. The ends of the arcuate conductor tracks may in this case lie on the ring sector region.

According to one embodiment of the disclosure, the arcuate conductor tracks all have an equal radius of curvature. The radius of curvature may be the radius of a circle by which an arcuate conductor track is defined. It should be understood that the center points of these circles may lie outside the ring sector region in which the receiving coils are arranged. As a result, the rotational angle sensor can advantageously be produced particularly easily and inexpensively. Also advantageously, as a result the deviation of the measuring signal from an ideal sinusoidal signal can be advantageously reduced and as a result the accuracy of the angular determination can be advantageously improved.

According to one embodiment of the disclosure, partial turns of different receiving coils are offset in relation to one another by an angle which is determined by half the measuring range divided by the number of receiving coils. In this way, measurement signals that differ to the maximum extent are obtained for each receiving coil. As a result, the accuracy of the angular determination is advantageously improved.

According to one embodiment of the disclosure, a receiving coil has partial turns with different surface areas. In the case of one receiving coil, the surface area of all the partial turns oriented in one direction may be equal to the surface area of all the partial turns oriented in a second direction. For example, a first receiving coil may have partial turns of the same size, while a second receiving coil has a first, for example middle, partial turn that is the same size as the partial turns of the first receiving coil but is angularly offset in relation to these partial turns.

Furthermore, the second receiving coil may have next to the first, for example middle, partial turn in the circumferential direction two smaller, for example lateral, partial turns (a second partial turn around a third partial turn), which are oriented oppositely in relation to the first, for example middle, partial turn but together cover the same surface area as the first, for example middle, partial turn.

According to one embodiment of the disclosure, at least one receiving coil has straight conductor tracks which run along the radial lines of the ring sector region. In this way, arcuate conductor tracks of lateral partial turns can be electrically connected to one another to form the lateral partial turns. This may be the case for example for conductor tracks that would run out laterally, i.e. in the circumferential direction, beyond the ring sector region.

According to one embodiment of the disclosure, the at least two receiving coils are formed in (just) two planes of the circuit board, i.e. in particular on the outer surface areas. In this way, the circuit board can be produced inexpensively. A multilayer circuit board is not necessary, in particular a circuit board with more than two layers is not necessary. As a result, production can be significantly simplified and carried out less expensively.

This can be accomplished by vertical interconnect accesses, where arcuate conductor tracks in different planes are connected, being provided at ends of the arcuate conductor tracks. In particular, the arcuate conductor tracks of a receiving coil may be arranged alternately in opposite planes of the circuit board.

According to one embodiment of the disclosure, the rotor element has at least one induction segment of a different conductivity than regions of the rotor element lying next to it in the circumferential direction around the axis of rotation. The induction segment may for example be a metallic segment (of a high conductivity), which is fastened on a non-metallic part of the rotor element; it may be a metallic elevation on the rotor element, but it may also be a clearance (of low conductivity) in a metallic rotor element.

For example, the at least one induction segment may be in the form of a sector of a ring. It is possible that the rotor element has a number of identically shaped induction segments.

According to one embodiment of the disclosure, the at least one induction segment has in the circumferential direction an acceptance angle (i.e. a maximum angle defined by the induction segment) which is half the measuring range of the rotational angle sensor. Partial turns of the receiving coils may also have such an acceptance angle. In this way, a maximum change in the measurement signals over the measuring range can be achieved. As a result, improved accuracy can be advantageously achieved, and a more robust signal can be provided.

According to one embodiment of the disclosure, the at least one induction segment has a number of radial clearances of a different conductivity than the induction segment. The clearances may be arranged at a periphery in the circumferential direction of the induction segment, it being possible for the induction segment to have a greater acceptance angle than half the measuring range. The clearances may be spaced apart in the circumferential direction with an angle that is half the measuring range of the rotational angle sensor. The induction segment may be divided into a large partial segment and smaller partial segments spaced apart from it in the circumferential direction.

With these clearances, the measurement signal can be shaped, since the smaller partial segments can influence the inductive coupling of partial turns that are arranged alongside a partial turn that is covered at the time by the large partial segment. In particular, a measurement signal that still has relatively small deviations from a sine function on account of the receiving coils can be influenced by the induction segment such that the deviations become smaller.

A further aspect of the disclosure relates to a stator element for a rotational angle sensor as described above and below.

According to one embodiment of the disclosure, the stator element comprises a transmitting coil and at least two receiving coils arranged within the transmitting coil, which are arranged on a circuit board; the at least two receiving coils are made up of arcuate conductor tracks electrically connected to one another, so that each of the at least two receiving coils is made up of partial turns oriented oppositely with respect to a current flow, each of which is delimited in a radial direction by at least one, for example arcuate, conductor track curved to the left and at least one opposite, for example arcuate, conductor track curved to the right.

BRIEF DESCRIPTION OF THE DRAWINGS

Embodiments of the disclosure are described below with reference to the accompanying drawings, in which connection neither the drawings nor the description should be construed as restricting the disclosure.

The figures are only schematic and not true to scale. In the figures, the same designations denote features that are the same or have the same effect.

DETAILED DESCRIPTION

Figure 1:
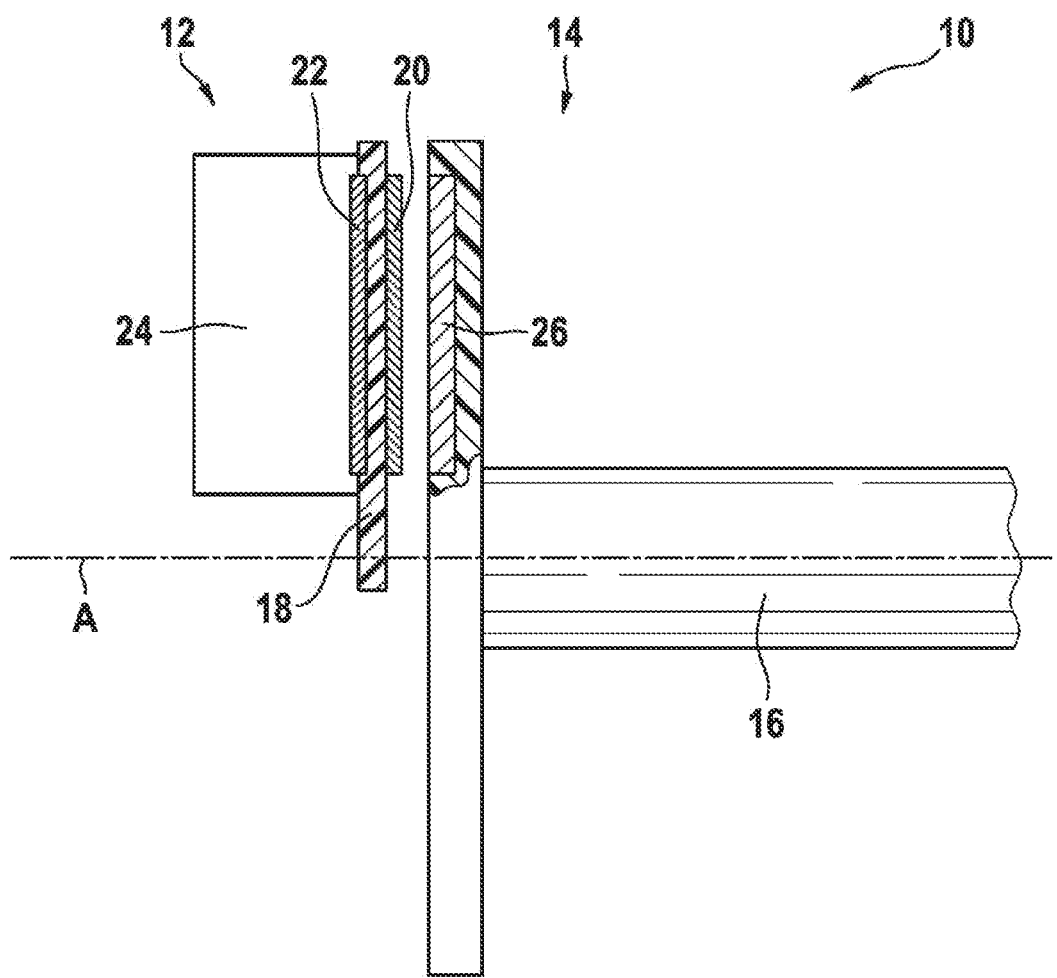
FIG. 1 shows a longitudinal section through a rotational angle sensor according to one embodiment of the disclosure.

FIG. 1 shows a rotational angle sensor 10 comprising a stator element 12 and a rotor element 14. The rotor element 14 may be fastened on a shaft 16 of a component, such as for instance a throttle valve, a motor, a camshaft, a gas pedal, etc., or be provided by this shaft 16. The shaft 16 is rotatable about the axis A and the stator element 12 lies opposite the rotor element 14 in the corresponding axial direction. For example, the stator element 12 is fastened on a housing of the component.

The stator element 12 comprises a circuit board 18, on which a transmitting coil 20 and a number of receiving coils 22 with conductor tracks are configured on the circuit board 18. The conductor tracks of the coils 20, 22 may be located on both sides of the circuit board 18. The conductor tracks may be electrically connected to one another through the circuit board by means of vias (vertical interconnect accesses). On the circuit board 18 there may be further components for an evaluation unit 24. The evaluation unit 24 can supply the transmitting coils 20 with an alternating voltage and determine induced alternating voltages in the receiving coils 22. On the basis of this measurement, the evaluation unit 24 can determine a relative rotational angle between the stator element 12 and the rotor element 14.

The rotor element 14 comprises one or more induction segments 26, which lie opposite one another in the axial direction of the transmitting coils 20 and the receiving coils 22. The induction segments 26 may, as shown in FIG. 1, be arranged on a further circuit board, which is fastened on the shaft 16. It is also possible that the induction segment or segments 26 is/are created by machining one end of the shaft 16.

Figure 2:
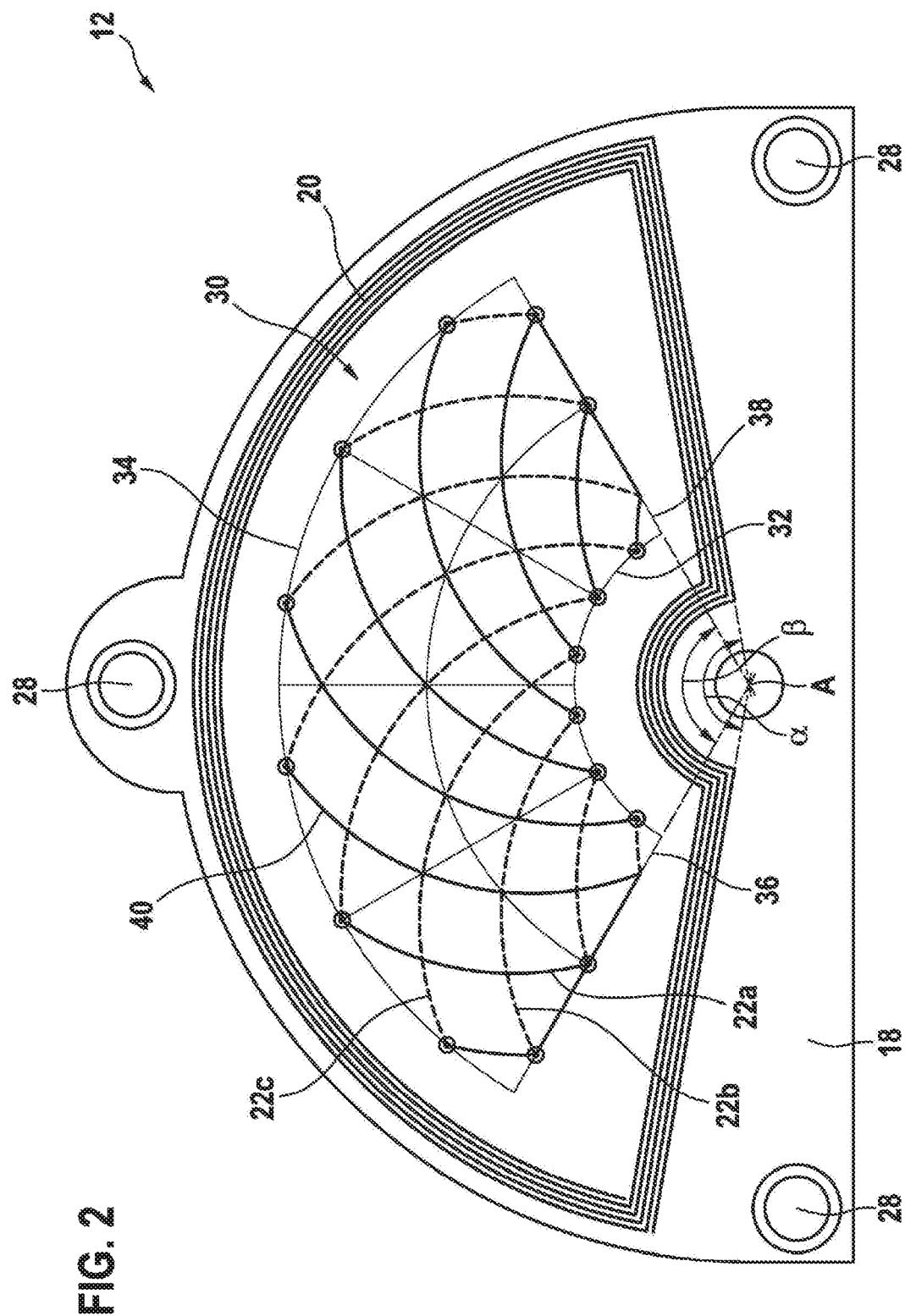
FIG. 2 shows a schematic plan view of a stator element for the rotational angle sensor from FIG. 1.

FIG. 2 shows the stator element 12 in plan view. The circuit board 18 is substantially semicircular and may have fastening holes 28. Both the transmitting coil 20 and the receiving coil 22 are configured as planar coils.

The transmitting coil 20, in the form of a sector of a ring, may have a plurality of conductor loops, which may also be implemented in a number of planes of a multilayer circuit board 18, in order to be able to create a sufficiently large field.

The first, second and third receiving coils 22a, 22b, 22c are arranged in a ring sector region 30 within the transmitting coil 20 that is defined by an inner circle around the axis of rotation A, an outer circle 34 around the axis of rotation A and two radial lines 36, 38 connecting the inner circle 32 to the outer circle 34. The radial lines 36, 38 are spaced apart from one another in the circumferential direction by an angle β, which also represents the measuring range of the rotational angle sensor 10. The receiving coils 22a, 22b, 22c are configured from arcuate conductor tracks 40, which all have the same radius of curvature. The special shape of the receiving coils 22a, 22b, 22c, which is described in still more detail with reference to FIGS. 3, 4 and 5, makes it possible that alternating voltages of amplitudes (as measurement signals) that depend on the rotational angle of the rotor element 14 with a sine function are induced in the receiving coils 22a, 22b, 22c. This allows particularly easy evaluation of the measurement signals in order to determine the rotational angle.

For example, the evaluation unit 24 may apply to the transmitting coil 20 an alternating voltage that has a frequency in the range of several MHz (preferably 5 MHz) and/or which has amplitudes in the range of 0.5 V to 10 V (preferably 1.5 V). This produces an alternating electromagnetic field, which is coupled into the receiving coils 22a, 22b, 22b and induces corresponding alternating voltages there. By appropriate shaping of the induction segments 26, the coupling between the transmitting coil 20 and the receiving coils 22a, 22b, 22c is influenced in a way dependent on the rotational angle. The typical range of values of the coupling factor, i.e. the amplitude ratio between the receiving coil and the transmitting coil, of the transmitting coil 20 with the receiving coils 22a, 22b, 22b may lie between −0.3 and +0.3. By demodulation of the measurement signal induced in the receiving coils 22a, 22b, 22c with the carrier signal (signal of the transmitting coil), the amplitude and phase of the coupling can be deduced. The amplitude varies continuously with the rotational angle. The phase is ideally 0° or 180°.

Figure 3:
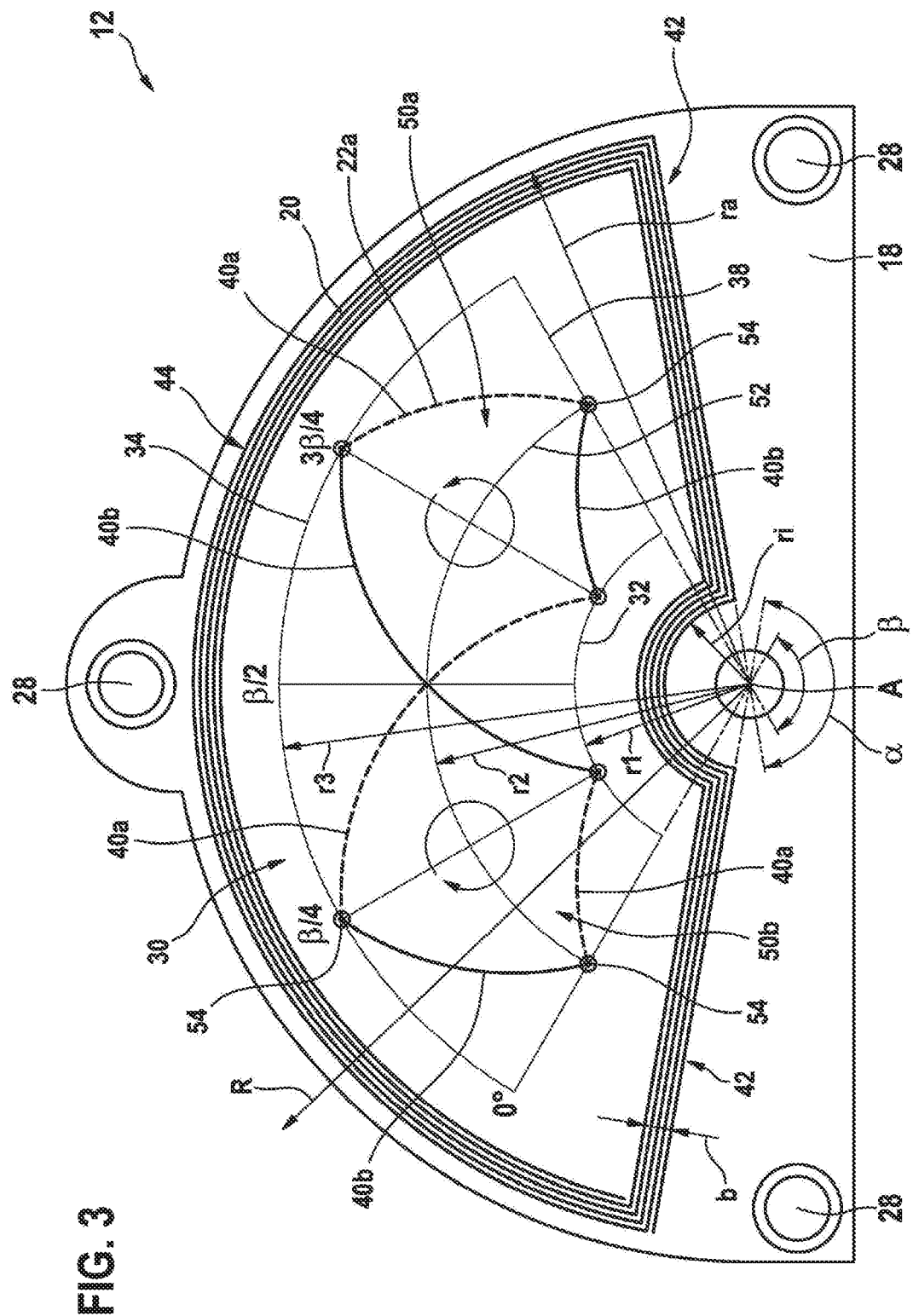
FIG. 3 shows a schematic plan view of the stator element from FIG. 2, in the case of which only a first receiving coil is represented.
Figure 4:
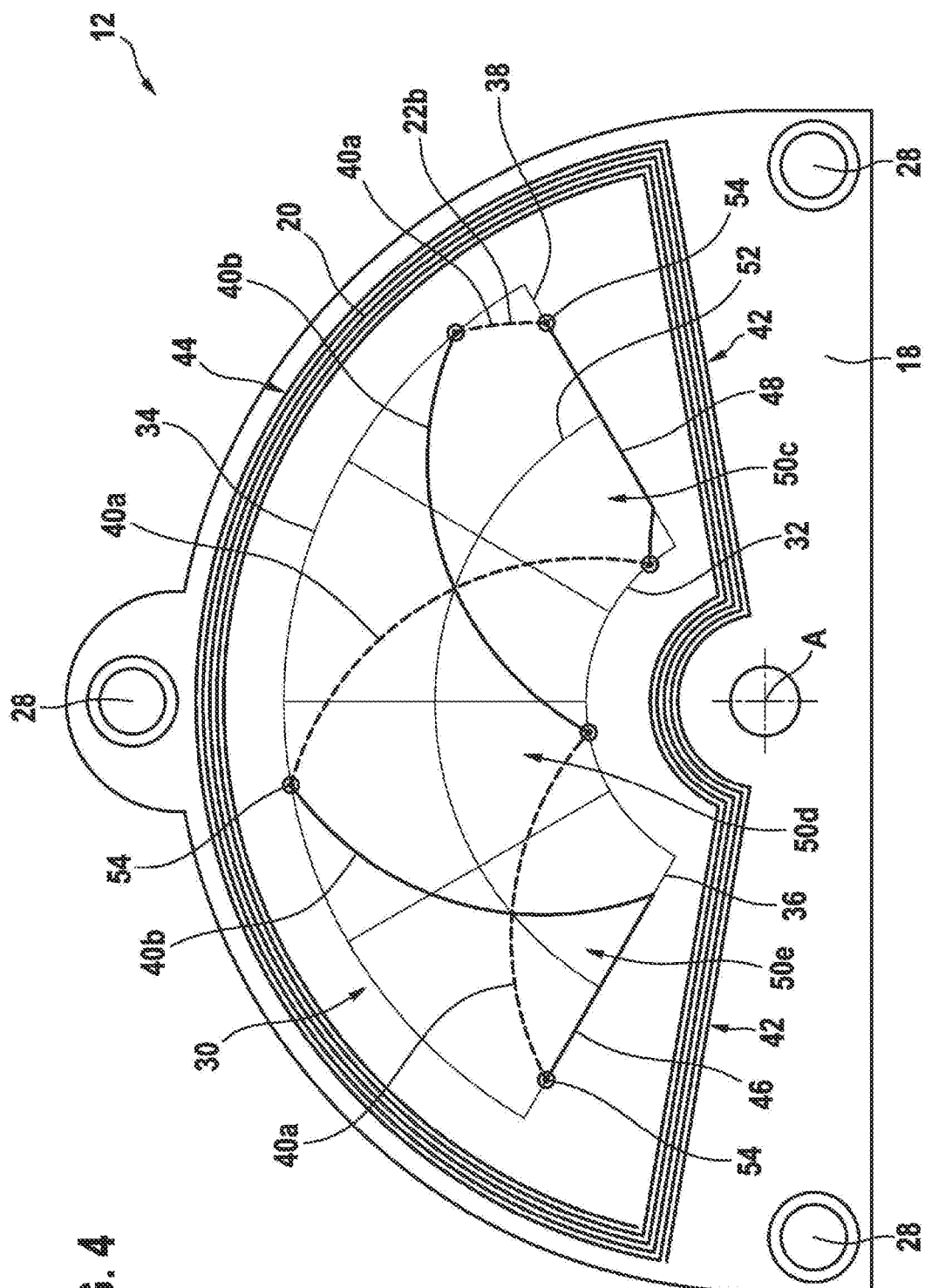
FIG. 4 shows a schematic plan view of the stator element from FIG. 2, in the case of which only a second receiving coil is represented.
Figure 5:
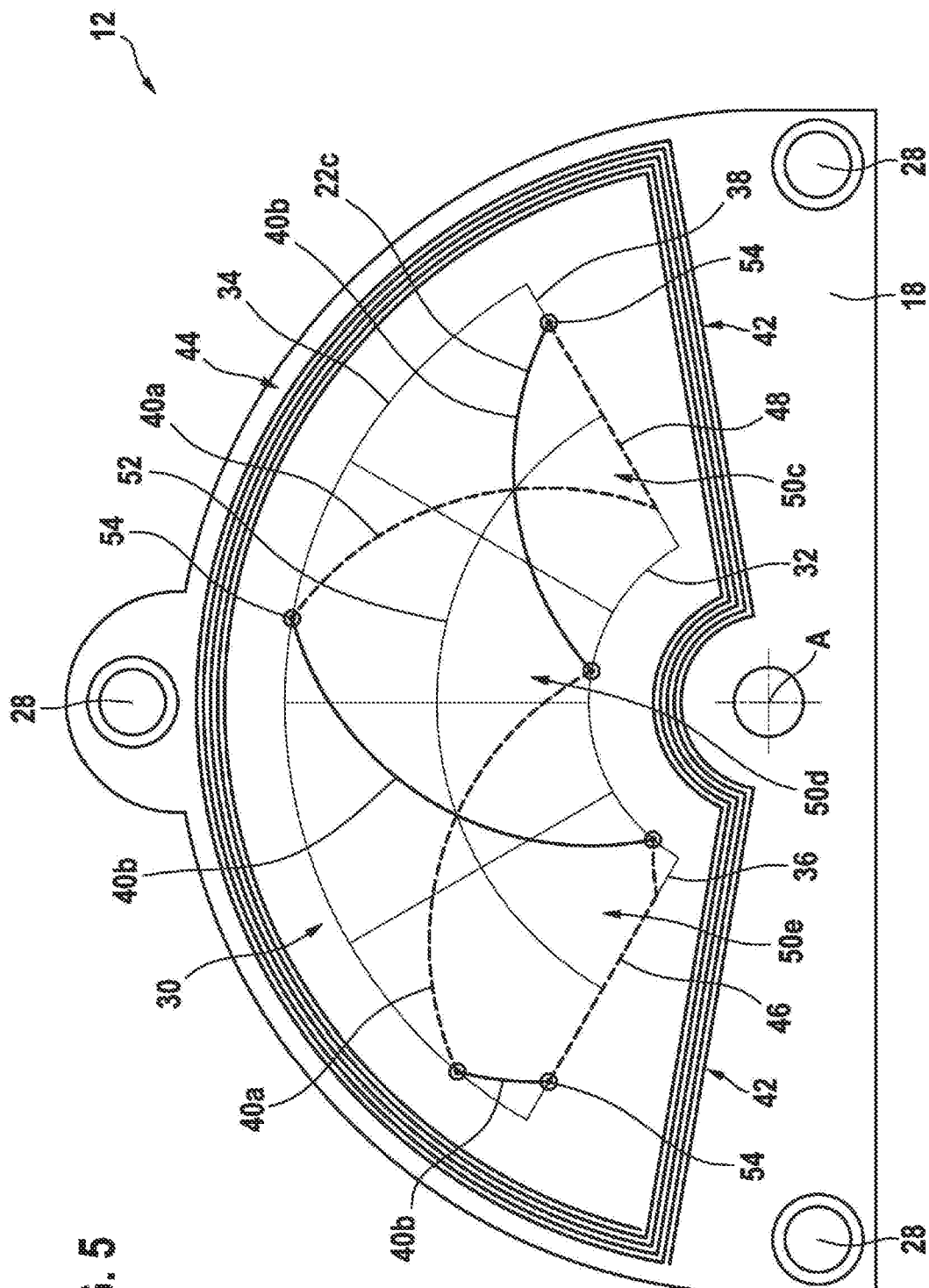
FIG. 5 shows a schematic plan view of the stator element from FIG. 2, in the case of which only a third receiving coil is represented.

FIGS. 3, 4 and 5 show the stator element 12 from FIG. 2, only one of the receiving coils 22a, 22b, 22c being shown for reasons of overall clarity.

By way of example, the measuring range β of the rotational angle sensor 10 is 120°. It can in principle assume any values less than 360°. The aperture angle α (for reasons of overall clarity, the opposite angle is depicted in FIG. 3) of the running-around transmitting coil 20 is preferably 5° to 10° more than the measuring range β of the rotational angle sensor 10, in order to keep down the influence on the receiving coils 22a, 22b, 22c of the field inhomogeneities in the region of radially running conductor tracks 42 of the transmitting coil 20.

These radially running conductor tracks 42 are connected by arcuate conductor tracks 44, which are delimited inwardly by an inner radius ri and outwardly by an outer radius ra. The outer radius ra is delimited upwardly by the available construction space and may be between 10 and 30 mm, approximately 25 mm. The inner radius ri may be dimensioned such that a shaft lead-through in the stator element 12 is made possible for the axis of rotation A, but may also be 0 mm if this is not required.

The receiving coils 22a, 22b, 22c are made up of arcuate conductor tracks 40a curved to the left and arcuate conductor tracks 40b curved to the right. The respective direction of curvature should be understood in this case from a viewing direction radially outward from the axis of rotation A.

By way of example, a radial direction R is depicted in FIG. 3. This radial direction R intersects an inner arcuate conductor track 40a, which is curved to the left, and an outer (or opposite) arcuate conductor track 40b, which is curved to the right. The same applies to all of the radial directions R within the measuring range β with the exception of the angle where the circular conductor tracks 40a, 40b are connected to one another.

The second receiving coil 22b and the third receiving coil 22c (FIGS. 4 and 5) additionally have straight conductor tracks 46, 48, which run along the radial lines 36, 38.

The first receiving coil 22a (FIG. 3) is only made up of the arcuate conductor tracks 40a, 40b, which are connected to one another at their ends so as to form two partial turns 50a, 50b, which are oriented oppositely to one another, i.e. when there is a flow of current through the receiving coil 22a are flowed through by current clockwise and counterclockwise, respectively. The two partial turns 50a, 50b have the same outline. The surface areas of the partial turns 50a, 50b are of the same size so as to neutralize a homogeneous magnetic field through the receiving coil 22a. (if no additional coupling with the rotor element 14 takes place). This is so because voltages of the same amount but different polarity are induced in the partial coils 50a, 50b.

On this basis, the rotational angle sensor 10 or the evaluation unit 24 can operate a self-diagnosis function, with which it can be detected that the rotor element 14 is missing and/or that one of the receiving coils has an electrical interruption. Furthermore, EMC interference influences, which generally take the form of a homogeneous field, can be suppressed.

The second receiving coil 22b and the third receiving coil 22c are made up of arcuate conductor tracks 40a, 40b, which are made up by way of their ends and by way of the straight conductor tracks 46, 48. Each of the second and third receiving coils 22b, 22c has partial turns 50c, 50d, 50e, which are oriented oppositely in succession with one another in the circumferential direction. The first, here middle, partial turns 50d have the same outline and/or the same surface area as one of the partial turns 50a, 50b of the first receiving coil 22a. The second and third, here lateral, partial turns 50c and 50e have, when made up, the same outline and/or together the same surface area as one of the partial turns 50a, 50b, 50d.

The crossing points of the arcuate conductor tracks 40a, 40b of the first, second and third receiving coils 22a, 22b, 22c are located on the inner circle 32 (with a first radius r1), a middle circle 52 (with a second radius r2) and the outer circle 34 (with a third radius r3).

The second radius r2 may in this case be the mean value of the first radius r1 and the third radius r3: r2=(r1+r3)/2. The first radius r1 is greater than the sum of the inner radius ri and the width b for the conductor tracks 42, 44 of the transmitting coil 20. For example, it may apply that: r1=ri+2b and r3=ra−2b.

The crossing points of the arcuate conductor tracks 40a, 40b are spaced apart in the circumferential direction by the same angle. The angle between the crossing points is β/4 (here 30°). The crossing points of the arcuate conductor tracks 40a, 40b of the receiving coil 22a are consequently at 0°, β/4, β/2, 3β/4 and β. The crossing points of the arcuate conductor tracks 40a, 40b of the receiving coils 22b and 22c are offset with respect to those of the receiving coil 22a to the left and right in each case by β/12.

In general, the required geometrical twist ξ of the receiving coils 22 is obtained from the measuring range β and the number of receiving coils m according to ξ=β/(2·m).

In the exemplary embodiment shown, a geometrical twist ξ of the three receiving coils 22a, 22b, 22c by 20° (ξ=120°/(2·3)=20°) is obtained for a three-phase system (m=3). With the twist, that part of the receiving coils 22b, 22c that exceeds the measuring range β to the right is inserted on the left with 0°.

It is possible to configure the three receiving coils 22a, 22b, 22c in just two planes of the circuit board 18. For example, the arcuate conductor tracks 40a, 40b and the straight conductor tracks 46, 48 may be arranged on the two sides of the circuit board 18. A configuration in just two planes has the advantage of an inexpensive circuit board 18. Furthermore, the average distance of all the receiving coils from the target is virtually identical, so that approximately the same signal levels are achieved for the measurement signals and the back-calculation can be carried out easily and robustly.

This can be achieved as follows: Arcuate conductor tracks 40a, 40b that run from radially inside to radially outside and from a smaller radius to a greater radius (r1, r2, r3) are placed in one plane and the remaining arcuate conductor tracks 40a, 40b are placed in the other plane. With the second receiving coil 22b and the third receiving coil 22c, the straight conductor tracks 46, 48 are placed covering over one another in different planes. At their ends, the conductor tracks 40a, 40b, 46, 48 are connected by means of vertical interconnect accesses 54, not all of which are marked with designations for reasons of overall clarity. The two vertical interconnect accesses 54 of the receiving coil 22a have in this case been shifted somewhat into the interior of the ring sector region 30. In other words, when proceeding from a small angle to a large angle about the axis A, first conductor tracks 40b that extend on their path from radially inside to outside (i.e. are right-curved) are to be arranged in one plane and second conductor tracks 40b that extend from radially outside to inside (i.e. are left-curved) are to be arranged in a further plane.

Figure 6:
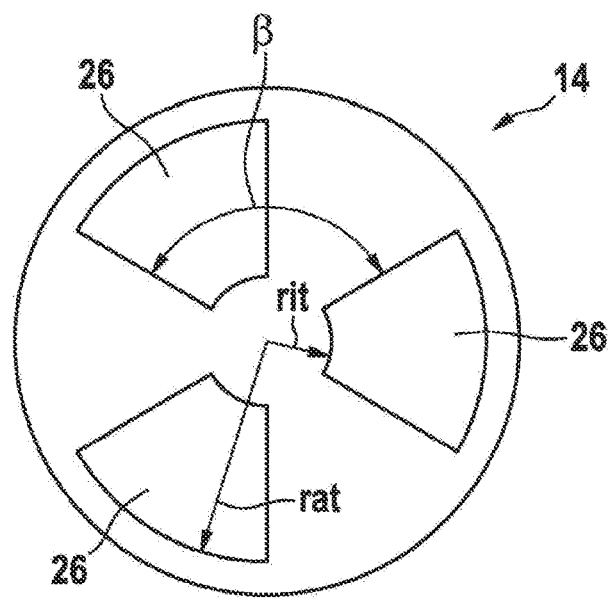
FIG. 6 shows a schematic plan view of a rotor element for the rotational angle sensor from FIG. 1.

FIG. 6 shows a schematic plan view of a rotor element 14, which is configured as a full circle. It is also possible that only an angular region of the rotor element 14 shown in FIG. 6, which comprises one or more of the induction segments 26, is used.

The rotor element 14 may be configured as a circuit board with induction segments 26 as metalization of the circuit board or as a metallic punched part, in the case of which the induction segments 26 represent elevations or depressions in the punched part.

The induction segments 26 are arcuate, extending in each case over half of the measuring range β, i.e. as represented here over 60°.

Preferably, straight or linear radial delimiting lines are used, whereby production that is particularly easy and dependable in manufacturing terms is ensured.

The inner radius rit and the outer radius rat of induction segments 26 may be chosen dependent on the inner radius ri and the outer radius ra of the transmitting coil 20. For example, it may apply that rit=(ri+b+r1)/2 and rat=(ra−b+r3)/2. In this case, b is the width of the conductor tracks 42, 44 of the transmitting coil 20.

Figure 7:
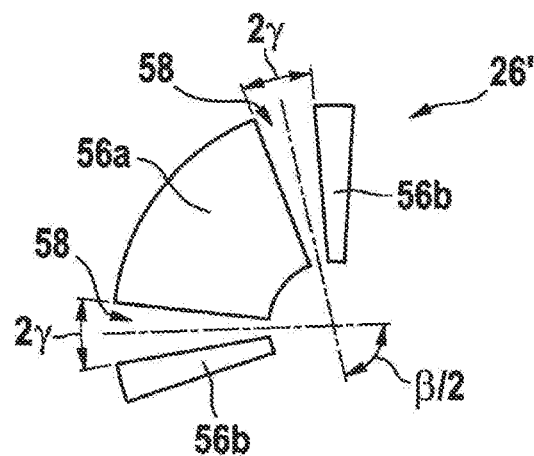
FIG. 7 shows a schematic plan view of an alternative induction segment for the rotor element from FIG. 6.

FIG. 7 shows an alternative embodiment of an induction segment 26', which is made up of a number of partial segments 56a, 56b. Each of the induction segments 26 from FIG. 6 may be made up like the induction segment from FIG. 6. Preferably, straight or linear radial edges are used.

The partial segments 56a, 56b are separated from one another by clearances 58 (for example milled reliefs), which have a different conductivity than the partial segments 56a, 56b. In this way, a sinusoidal shape of the measurement signals can be improved.

Each of the clearances 58 may be for example an angle of 2γ wide in the circumferential direction. In this case, the middle partial segment may have an angle of β/2−2γ and the outer partial segments may have an angle of γ.

Figure 8:
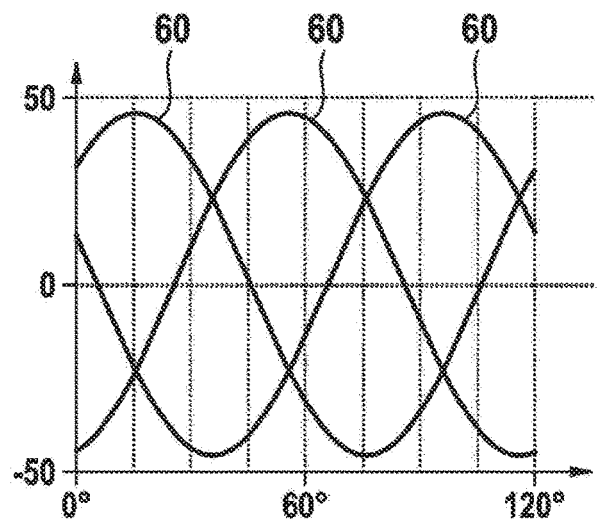
FIG. 8 shows a diagram with measurement signals that are generated by a rotational angle sensor according to one embodiment of the disclosure.

FIG. 8 shows a diagram with three sinusoidal measurement signals 60, which can be emitted by the receiving coils 22a, 22b, 22c and which can be approximated even further to a sine function by a rotor element 14 with one or more induction segments 26' according to FIG. 7. The measurement signals represent the amplitude of an alternating voltage induced in a receiving coil that is dependent on the angle of the rotor element 14 with respect to the stator element 12.

On account of feed lines of different lengths, a positioning of conductor tracks in different planes of the circuit board 18 and mechanical tolerances, the measurement signals 60 for example may be affected by offset (i.e. the three measurement signals 60 in such a case do not run symmetrically with respect to the x-axis).

This offset can be calculated out particularly easily from measurement signals 60 that are as sinusoidal as possible, for example by way of a Clarke transformation. Measurement signals that are as sinusoidal as possible may also be advantageous because trigonometric laws, such as for example $\sin_2 + \cos^2 = 1$, can be applied and can be used at least for checking the plausibility of the signals or else for a correction.

For example, three sinusoidal measurement signals 60 with typically a 120° electrical phase offset, which by application of a Clarke transformation can be transformed into a sine/cosine system, are produced in the three receiving coils 22a, 22b, 22c. With the aid of the arctangent function, the rotational angle can be deduced from this.

It is also possible that the rotational angle sensor 10 comprises just two receiving coils 22 with a 90° electrical phase offset (the mechanical phase offset and electrical phase offset may differ). In this case, an (ideally) offset-free sine/cosine system is produced by multiplication of the amplitude of the two measurement signals 60 by the cosine of the phase. With the aid of the arctangent function, the rotational angle of the rotor element 14 can be deduced from this.

In general, these two receiving coils 22a, 22b are required for the back-calculation of the measurement signals 60 by way of the arctangent function.

For reasons of redundancy, the rotational angle sensor 10 may also be equipped with six receiving coils 22, which for example may all be implemented in two planes of the circuit board 18. In each case three of the six receiving coils 22 may then be used as a redundant three-phase system. Since the receiving coils 22 are then on average all equally far away from the rotor element 14 (in comparison with an implementation in six or more planes), the offset of the measurement signals 60 is approximately identical and the levels are comparably high. This facilitates the evaluation considerably.

Finally, it should be pointed out that terms such as "having", "comprising" etc. do not exclude other elements or steps and terms such as "a" or "one" do not exclude more than one. Designations in the claims should not be regarded as restrictive.

The invention claimed is:

1. A rotational angle sensor, comprising:
a stator element with a transmitting coil and at least two receiving coils arranged completely within the transmitting coil, which are arranged on a circuit board; and
a rotor element, which is mounted rotatably about an axis of rotation with respect to the stator element and by way of which the transmitting coil is inductively coupled to the at least two receiving coils, so that the inductive coupling is dependent on a rotational angle between the stator element and the rotor element and the transmitting coil induces at least two angle-dependent alternating voltages in the at least two receiving coils,
wherein the rotor element and the at least two receiving coils are configured such that an alternating voltage of an amplitude that is sinusoidally dependent on the rotational angle is induced in the receiving coils,
wherein the at least two receiving coils include arcuate conductor tracks electrically connected to one another, and
wherein the at least two receiving coils are arranged in a ring sector region within the transmitting coil, which is defined by an inner circle around the axis of rotation, an outer circle around the axis of rotation and two radial lines connecting the inner circle to the outer circle, which are spaced apart from one another along the circumference over a measuring range of the rotational angle sensor, and wherein the arcuate conductor tracks lie on the ring sector region.

2. The rotational angle sensor as claimed in claim 1, wherein the arcuate conductor tracks all have an equal radius of curvature.

3. The rotational angle sensor as claimed in claim 1, wherein partial turns of different receiving coils are offset in relation to one another in a circumferential direction by an angle which is determined by the measuring range divided by the number of receiving coils.

4. The rotational angle sensor as claimed in claim 1, wherein one or more of (i) the at least two receiving coils has partial turns with different surface areas and (ii) in the case of one receiving coil, the surface area of all the partial turns oriented in one direction is configured to be equal to the surface area of all the partial turns oriented in a second direction.

5. The rotational angle sensor as claimed in claim 1, wherein at least one receiving coil has straight conductor tracks, which run along radial lines of the ring sector region.

6. The rotational angle sensor as claimed in claim 1, wherein one or more of:
the at least two receiving coils are formed in two planes of the circuit board, vertical interconnect accesses, where arcuate conductor tracks in different planes are connected, are provided at ends of the arcuate conductor tracks, and the arcuate conductor tracks of the at least two receiving coils are arranged alternately in opposite planes of the circuit board.

7. The rotational angle sensor as claimed in claim 1, wherein the rotor element has at least one induction segment of a different conductivity than regions of the rotor element lying next to it in a circumferential direction around the axis of rotation, and wherein the at least one induction segment is in the form of a sector of a ring.

8. The rotational angle sensor as claimed in claim 7, wherein the at least one induction segment has in the circumferential direction an acceptance angle which is half the measuring range of the rotational angle sensor.

9. The rotational angle sensor as claimed in claim 7, wherein one or more of:
the at least one induction segment has a number of radial clearances of a different conductivity than the induction segment,
the clearances are arranged at a periphery in the circumferential direction of the induction segment, and
the clearances are spaced apart in the circumferential direction with an angle that is half the measuring range of the rotational angle sensor.

10. The rotational angle sensor as claimed in claim 1, wherein each of the at least two receiving coils includes partial turns oriented oppositely with respect to a current flow, each of which is delimited in a radial direction by at least one arcuate conductor track curved to the left and at least one opposite arcuate conductor track curved to the right.

11. The rotational angle sensor as claimed in claim 1, wherein the transmitting coil and that at least two receiving coils are provided on the same circuit board.

* * * * *